Patented July 10, 1928.

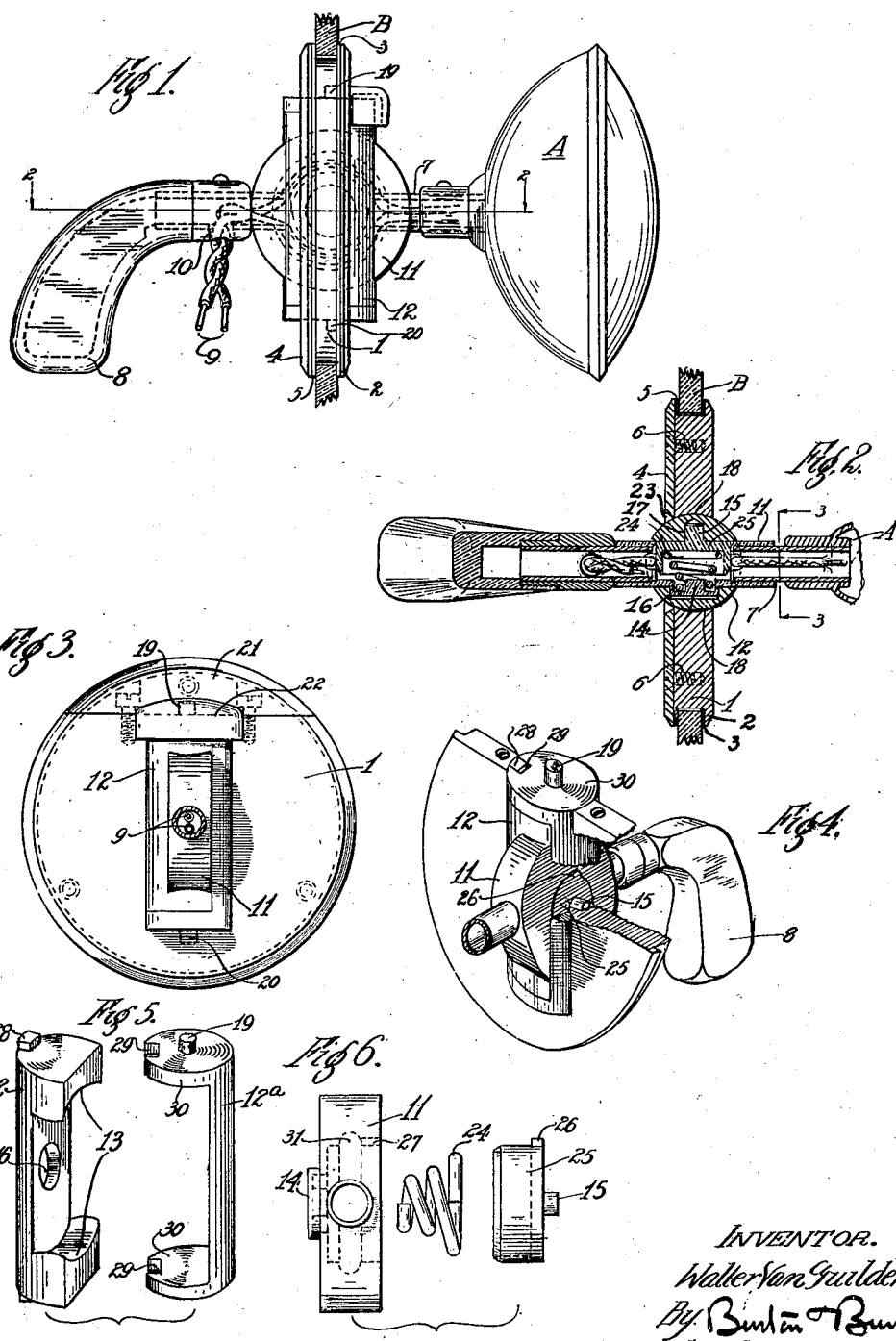

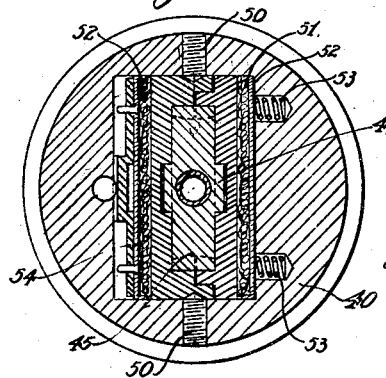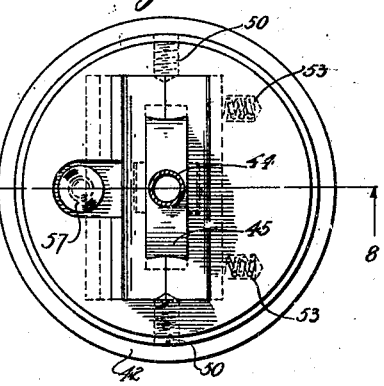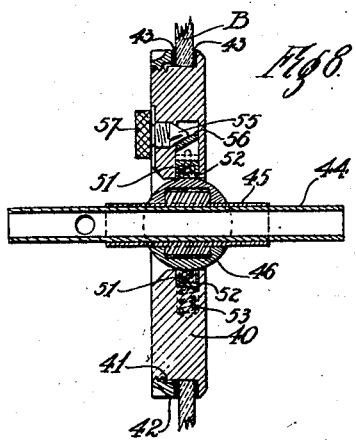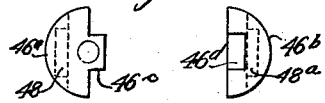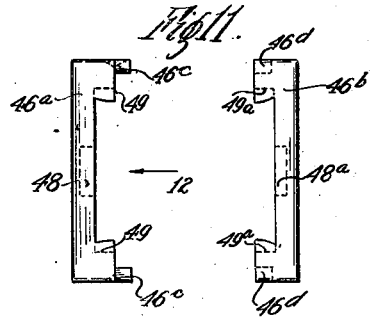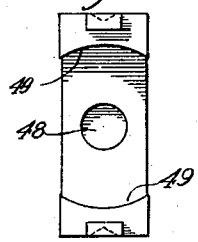

1,676,750

UNITED STATES PATENT OFFICE.

WALTER VAN GUILDER, OF CHICAGO, ILLINOIS, ASSIGNOR TO STEWART-WARNER SPEEDOMETER CORPORATION, OF CHICAGO, ILLINOIS, A CORPORATION OF VIRGINIA.

VEHICLE SEARCHLIGHT MOUNTING.

Application filed January 24, 1925. Serial No. 4,592.

The purpose of this invention is to provide an adjustable mounting for a light projector such as a vehicle searchlight or spotlight, such mounting being designed and arranged to be set into a wall, preferably a front wall of a vehicle, such as the customary front window or windshield. The invention consists in various features of construction and their combination as herein shown and described and as indicated by the claims.

In the drawings:—

Figure 1 is a side elevation of a searchlight and its mounting embodying this invention, together with a fragmentary representation of the windshield in which it is secured.

Figure 2 is a transverse section taken as indicated at line 2—2 on Figure 1.

Figure 3 is a front elevation of the mounting taken as a section at the line 3—3 on Figure 2.

Figure 4 is a perspective view with parts broken away.

Figure 5 is a perspective view of the two parts of the cylindrical carrier in disassembled relation.

Figure 6 is a front elevation of the three pieces which make up the lamp-supporting arm, showing them in disassembled relation.

Figure 7 is a rear elevation of a modified form of mounting embodying the invention.

Figure 8 is a transverse section taken as indicated at line 8—8 on Figure 7.

Figure 9 is a vertical section taken substantially as indicated at line 9—9 on Figure 8.

Figure 10 is a top plan view of the two halves of the cylindrical carrier in disassembled relation.

Figure 11 is a front elevation of said parts.

Figure 12 is a side elevation of one of the parts shown in Figure 11 looking in the direction of the arrow, 12, thereon.

The searchlight or spotlight shown at A in Figure 1 is designed for the usual purpose of throwing a concentrated beam of light onto a particular portion of the road or onto objects such as sign posts, house numbers or other vehicles momentarily to assist the driver in finding his way, and the purpose of the particular forms of mounting embodying this invention is to position the light for more convenient manipulation by the driver than when it is carried at one side of the car body as has been standard practice.

By virtue of the constructions herein shown, the searchlight mounting may be secured firmly in an aperture cut in the windshield glass, B; and since the most convenient form of aperture to cut is a circular one the mounting member, 1, is made circular in outline with a flange, 2, to seat against the outer surface of the glass, preferably with a gasket, 3, interposed. In this form the mounting includes a clamping plate, 4, and a second gasket, 5, secured against the rear face of the glass, B, by suitable screws, 6, entering the mounting disk, 1, as shown in Figure 2. The lamp body, A, is carried on a tubular arm, 7, extending centrally through the aperture in the windshield, B, and provided at its inner end with a handle, 8. Lead wires, 9, for the lamp, A, extend therefrom through the hollow arm, 7, and preferably emerge through an opening, 10, not far back of the plane of the glass, B, whence they extend downwardly to any convenient connection with the usual battery, not shown; such connection is generally accessible under the instrument board of the vehicle directly below the windshield.

To render the lamp, A, sufficiently adjustable for its purpose, it must have a range of movement horizontally and a range of movement vertically so that by combination of these movements the beam may be directed upon any point within a fairly wide range ahead of the vehicle. For this purpose I provide the arm, 7, with a flat circular enlargement or bearing member, 11. This circular member, 11, is snugly fitted into a rectangular opening in an immediate carrier, 12, which is cylindrical in form having its axis extending transversely and preferably at right angles to the axis of the member, 11, and may intersect it. It is also preferable that the vertical axis of the cylinder, 12, lie within the plane of the windshield glass or wall, B, since said member, 12, is mounted in the support consisting of the disk, 1, for rotation upon its said vertical axis and this relation of the parts permits the widest range of movement with the least provision for clearance. The opening in the member, 12, provides curved upper and lower surfaces, 13, on which the curved surface of the part, 11, is seated for rotation about the axis of the part, but I also provide trunnions, 14 and 15, engaging bearing recesses, 16 and 17, respectively. This allows for fairly wide vertical angle of adjustment. In a similar manner the support consisting of the mounting plate, 1, is formed with a rectangular opening having curved lateral walls, 18, which snugly engage the sides of the cylinder, 12, to permit rotation about its axis and these bearing surfaces are supplemented by upper and lower trunnions, 19, entering recesses, 20, in the plate. To permit assembly of the parts, the plate, 1, is formed with a removable section, 21, fitting over the upper end of the cylinder, 12, and preferably provided with an integral hood, 22, which will serve to exclude moisture from the upper end surface of the cylinder, 12. If, as shown, the axis of the cylinder, 12, be placed midway between the front and rear faces of the plate, 1, the clamping plate, 4, may be recessed at 23 to provide clearance for the maximum possible swing of the cylinder, 12, in this mounting.

To provide sufficient friction between the bearing surfaces of the adjustable parts for insuring that they will remain at any position of adjustment, and also to take up wear at these surfaces and exclude wind and moisture so that the mounting as a whole may serve effectively as a closure of the aperture of the windshield in which it is secured, I have shown a take-up spring, 24, pocketed within the member, 11, and reacting between the boss or trunnion, 14, and the separable member, 25, which telescopes within the part, 11, and is itself chambered to contain said spring, 24. Then by making the cylinder, 12, with a separable part, 12$^a$, as clearly shown in Figure 5, I permit the expansive force of the spring, 24, to act with a tendency to separate said parts, 12 and 12$^a$. Thus the spring, 24, produces friction between the flat walls of the member, 11, and the flat walls of the rectangular opening in the cylinder, 12, and also produces friction between the cylindrical outer walls of the part, 12, and the curved bearing surfaces, 18, of the plate 1. Preferably the member, 25, is formed with a key or tongue, 26, engaging a recess, 27, in the part, 11, to prevent its rotation therein and confine its movement to a direct sliding action along the axis; and the cylinder, 12, may be formed with projecting tongues or keys, 28, engaging slots, 29, in the overlapping ends, 30, of the part, 12$^a$, for holding the two members in the proper relation to form a substantially perfect cylinder. As indicated in Figure 6, a clearance recess, 31, may be provided in the part, 11, around the part, 25, to accommodate the lead wires, 9, of the lamp.

In Figures 7 to 12 I have shown a modified construction which accomplishes the same result but in some respects simplifies manufacture. In this arrangement the mounting plate is shown at 40, with its periphery at the rear side formed with threads, 41, to receive a threaded clamping ring, 42, by which the plate is secured in the windshield glass, B, suitable gaskets being interposed at 43. The lamp-carrying arm, 44, is tubular to accommodate the lead wires as in the first described structure and rigidly associated with it is a flat cylindrical enlargement, 45, journaled in the vertically extending cylindrical carrier, 46. The enlargement, 45, is a one-piece construction including trunnions, 47, engaging recesses, 48, in the flat walls of the opening provided in the cylinder, 46, while its curved surfaces engage the upper and lower arcuate surfaces, 49, formed in the cylinder, 46. Said cylinder is made in two parts, 46$^a$ and 46$^b$, with tongues, 46$^c$, on one part engaging notches, 46$^d$, in the other to permit limited lateral movement. The cylinder is pivotally carried in the plate, 40, by cone pointed trunnion screws, 50, engaging recesses formed in the tongues, 46$^c$, and a snug fit between its cylindrical side walls and the margins of the opening in the part, 40, is assured by compressible packing strips, 51, in channelled carriers, 52, which are yieldingly pressed against the cylinder, 46, by pocketed springs, 53, at one side of the rectangular opening in the plate, 40. At the other side a follower, 54, engages the channeled carrier, 52, and a cone pointed adjusting screw, 55, acting against an inclined surface, 56, of said follower serves to modify the pressure for frictional engagement between the packing, 51, and the cylinder, 46. By making the halves, 46$^a$ and 46$^b$, slightly less than semi-cylindrical so as to leave a small clearance between them when they are assembled with the part, 45, the pressure thus exerted through the packing, 51, will be transmitted also to the flat faces of the part, 45, and provides sufficient friction to maintain it in any adjusted relation in the cylinder, 46. The adjusting screw, 55, is formed with a knurled head, 57, accessible at the inner side (that is the side toward the driver) of the windshield, B, so that if desired the parts may be practically clamped at any selected position of adjustment.

I claim:—

1. In combination with an apertured wall, a searchlight and the like by which it is carried extending transversely of said wall; an immediate carrier for the arm to which the same is pivoted transversely of the length of the arm for rocking longitudinally; a support to which said immediate carrier is pivoted transversely both of the length of the arm and of the pivot of the arm to the carrier, said support being secured at the wall aperture, the immediate carrier and the support therefor being respectively a cylinder which is long relatively to its diameter, and a cylinder which is flat and thin relatively to its diameter, the cylindrical carrier being longitudinally divided at a plane cutting the aperture which accommodates the bearing member, and means for pivoting the latter in the former, comprising two pivotal trunnions adapted for housing between them a spring, and a spring so housed for reacting to spread the trunnions, thereby tending to spread the divided members of the cylindrical carrier for simultaneously effecting snug seating of the trunnion bearing parts in the cylindrical carrier and the parts of the cylindrical carrier in the mount.

2. In combination with an apertured wall a searchlight; an arm supporting the same and extending through the aperture of the wall, mounting means secured in the aperture, and a cylindrical carrier snugly fitting in said mounting means for rotating about its axis therein, the arm being pivotally mounted in the carrier for adjustment about a transverse axis, said mounting being formed with a groove adjacent the cylindrical carrier, a compressible packing strip in the said groove in contact with the carrier cylinder, and a follower member for said packing having a surface oblique to the face of the packing which contacts with the cylinder; an adjusting screw carried in the mounting with a conical point engaging said oblique face, whereby the screw may exert pressure against the cylinder through the packing.

3. In the combination defined in claim 2, said mounting having a second groove adjacent the opposite side of the carrier cylinder, a packing strip lodged in said groove and a follower spring for yieldingly maintaining contact of the packing with the cylinder.

4. In combination with an apertured wall a searchlight, an arm supporting the same and extending through the aperture of the wall, mounting means secured in the aperture, and a cylindrical carrier snugly fitted in said mounting, means for rotating about its axis therein, the arm being pivotally mounted in the carrier for adjustment about a transverse axis, said carrier being composed of two parts separable at a plane transverse to the axis at which the arm is pivoted in the carrier, the pivotal mounting of the arm including flat surfaces parallel to said plane, adapted to be gripped between the two parts of the cylindrical carrier; adjustable means in the mounting engaging opposite sides of said cylindrical carrier, and means for varying the pressure of such engagement for adjustably clamping the cylinder in the amount and the arm between the two parts of the cylinder.

5. In the combination defined in claim 4, said adjustable means extending from the mounting for access at the side thereof opposite that from which the searchlight extends on the arm.

6. In combination with an apertured wall, a search light or the like, having an arm by which it is carried, extending transversely of said wall; mounting means secured in said aperture; a cylindrical carrier supported in said mounting and adapted to be rotated therein about its axis; said arm being provided with a bearing member, comprising a circular disc which is pivotally mounted in said carrier at an axis transverse both to the axis of the carrier and to the longitudinal axis of said arm, whereby to provide a relatively wide range of vertical and horizontal adjustment of the arm carrying the search light or the like; and means co-operating with said carrier for maintaining said arm with the search light in any adjusted position.

7. In combination with an apertured wall, a search light or the like, having an arm by which it is carried, extending transversely of said wall; mounting means secured in said aperture; a cylindrical carrier supported in said mounting and adapted to be rotated therein about its axis; said arm being provided with a bearing member, comprising a circular disc, which is pivotally mounted in said carrier at an axis transverse both to the axis of the carrier and to the longitudinal axis of said arm, whereby to provide a relatively wide range of vertical and horizontal adjustment of the arm carrying the search light or the like; and means carried by said bearing member adapted to yieldingly engage said carrier whereby a portion of the lateral surface thereof is subjected to frictional contact with the mounting means, to secure a substantially waterproof joint and maintain the arm in any adjusted position.

In testimony whereof, I have hereunto set my hand at Chicago, Illinois, this 23rd day of January, 1925.

WALTER VAN GUILDER.